M. SMITHEY.
SPEEDOMETER.
APPLICATION FILED AUG. 14, 1916.

1,208,678.

Patented Dec. 12, 1916.

WITNESSES

INVENTOR
MARVIN SMITHEY,
BY
ATTORNEYS

UNITED STATES PATENT OFFICE.

MARVIN SMITHEY, OF LAWRENCEVILLE, VIRGINIA.

SPEEDOMETER.

1,208,678.

Specification of Letters Patent.

Patented Dec. 12, 1916.

Original application filed December 11, 1915, Serial No. 66,288. Divided and this application filed August 14, 1916. Serial No. 114,878.

*To all whom it may concern:*

Be it known that I, MARVIN SMITHEY, a citizen of the United States, and a resident of Lawrenceville, in the county of Brunswick, in the State of Virginia, have invented certain new and useful Improvements in Speedometers; and it consists in the constructions, combinations, and arrangements hereinafter described and claimed.

The device which forms the subject of the present application was disclosed in a prior Patent #1,195,161, August 15, 1916, and the present application is a division of the said prior application.

The speedometer hereinafter described is preferably used in connection with odometers, which relate to particular parts of the vehicle, such as tires, the odometers and speedometer being driven by a common power shaft operated through the medium of a flexible connection such as that ordinarily connecting a speedometer with the wheels or other movable parts of the vehicle.

An object of my invention is to provide a speedometer which is of exceedingly simple construction, and yet which accurately registers the rate at which the vehicle is going.

A further object of my invention is to provide a speedometer, whose mechanism takes up very little space and which therefore can be combined with the odometer mentioned, the combined mechanism occupying very little room.

Figure 1:
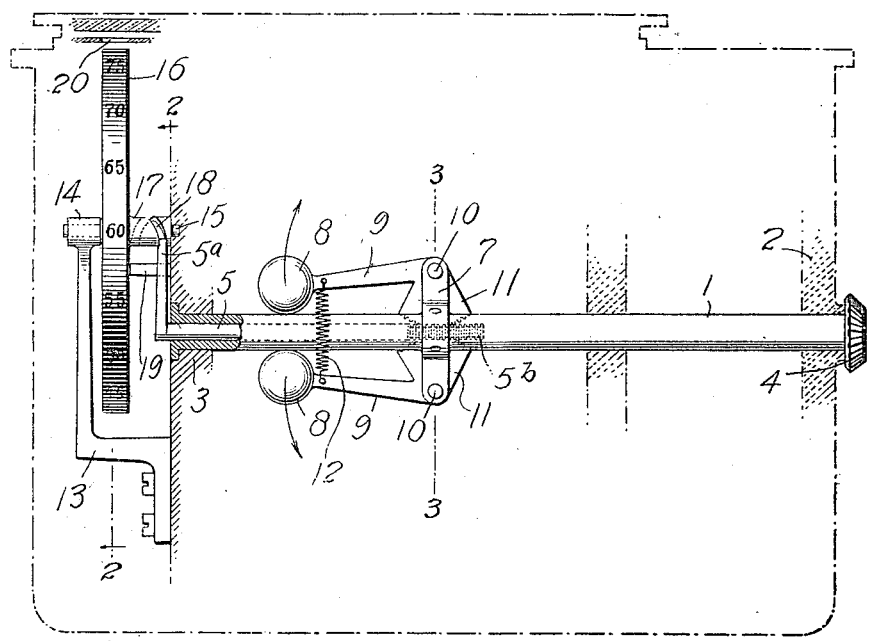
Figure 2:
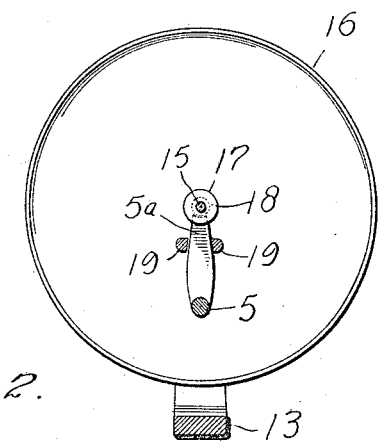
Figure 3:
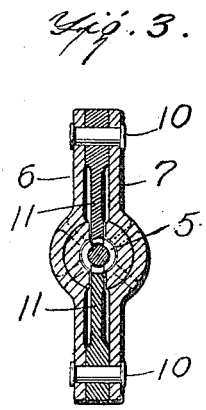

My invention is illustrated in the accompanying drawings, forming a part of this application, and in which;

Figure 1 is a side view of the working parts of the speedometer; Fig. 2 is a section along the line 2—2 of Fig. 1; and Fig. 3 is a section along the line 3—3 of Fig. 1.

In the drawings, 1 denotes the power shaft which is journaled at one end in the wall 2 of the casing and at the other end in a partition 3. The power shaft is provided with a gear 4 which is arranged to be driven by a mechanism not shown, any suitable means being used. The shaft 1, is hollow. Slidably disposed in one end of the shaft is a rod 5 which has a laterally turned end $5^a$, the opposite end of the rod $5^b$ being formed into a rack, the teeth of the rack being circular.

Secured to the shaft 1 are arms 6 and 7, between the ends of which are pivotally mounted the centrifugal devices. Each of these centrifugal devices comprises a ball 8 at the end of an arm 9 which is pivoted at 10 between the arms 6 and 7 and which is provided with a segmental gear portion, 11, these gear portions being arranged to engage the rack $5^b$ on opposite sides thereof, slots $1^x$ being provided for receiving the segments. The balls 8 are normally held toward the axial line of the shaft by means of a spring 12.

Secured to the partition 3 is a bracket 13 having a bearing 14 at its upper end. A shaft 15 is secured in this bearing at one end and at the other end in the partition 3. Loosely mounted on a shaft is a number wheel 16 having a hub 17 provided with a cam groove 18, into which the ends of the arm $5^a$ extend. Guide pins or arms 19 are disposed on either side of the arm 52.

From the foregoing description of the various parts of the device, the operation thereof may be readily understood. When the vehicle is at rest the power shaft 1 is stationary, the spring 12 holding the centrifugal member in the position shown in Fig. 1, the number wheel registering zero through the reading opening 20.

When the vehicle starts up the rotation of the shaft 1 will cause the centrifugal members to fly apart thereby moving the rod 5 outwardly and causing the end of the rod to pass along the cam groove 18, thus turning the number wheel a distance which corresponds with the speed of the vehicle. It will be understood that the cam groove 18 is so constructed that the movement of the wheel is in proportion to the speed of the vehicle. This is found by experiment.

The device described is exceedingly simple in its nature, and has few parts and is therefore, not liable to easily get out of order.

I claim:

1. A speedometer comprising a hollow drive shaft, a slidable rod disposed in one end of said hollow shaft, said slidable rod being provided at one end with a laterally extending portion disposed outside of the hollow shaft and at the other end with a rack portion consisting of a series of circular teeth disposed within the hollow shaft, a pair of arms secured on opposite sides of said power shaft, a pair of centrifugal members pivoted to said arms on opposite sides of the shaft, each of said centrifugal members comprising a lever, a weight secured to the end of the lever, one end of the lever being formed into a segmental gear arranged to extend through an opening in the shaft and to engage the rack, a stub shaft, a number wheel loosely mounted on said stub shaft and having a hub provided with a cam groove arranged to receive one end of said laterally extending portion of the slidable rod, and a pair of guide members for guiding the movement of said laterally extending portion.

2. A speedometer comprising a hollow drive shaft provided with opposed openings, a rod slidably disposed in one end of said hollow shaft, a laterally extending arm secured to one end of said slidable rod outside of said hollow shaft, the opposite end of the rod being provided with a rack disposed within the hollow shaft and arranged to register with said openings, a pair of centrifugal members each having a segmental gear arranged to extend through one of said openings and to engage the rack, a stub shaft, a number wheel, loosely mounted on said stub shaft and having a slot provided with a cam groove arranged to receive one end of said laterally extending arm, and means for guiding the movement of said laterally extending arm.

3. A speedometer, comprising a hollow drive shaft having an opening, a rod slidably disposed in one end of said hollow shaft, a rack portion, a centrifugal device secured to the exterior of said hollow shaft, means carried by said centrifugal device and arranged to extend through the opening in the hollow drive shaft for engaging the rack when the latter is rotated, a laterally extending arm secured to said rod at the end outside of the hollow shaft, a stub shaft, a number wheel loosely mounted on said stub shaft and having a hub provided with a cam groove arranged to receive one end of said laterally extending arm, and means for guiding the movement of said laterally extending arm in a direction parallel to the axis of the hollow shaft.

4. A speedometer, comprising a hollow drive shaft having an opening, a centrifugal device carried by said hollow shaft and having a portion arranged to extend through said opening, a rod slidably disposed to extend through one end of said hollow shaft and having a rack portion arranged to be engaged by said centrifugal device for moving the rod longitudinally with respect to the axis of the hollow shaft, a stub shaft, a number wheel loosely mounted on said stub shaft and having a hub provided with a cam groove, and means carried by said slidable rod and arranged to extend into said cam groove for causing the turning of the number wheel in proportion to the movement of the sliding rod.

5. A speedometer, comprising a hollow drive shaft having an opening, a centrifugal device carried by said hollow drive shaft and provided with a portion arranged to extend through the opening, a rod slidably disposed within the hollow shaft and arranged to be engaged by the inwardly extending portion of the centrifugal device, a number wheel having a hub provided with a cam groove, means carried by the slidable rod and arranged to extend into said cam groove for causing the rotation of the number wheel when the rod is moved.

6. A speedometer, comprising a hollow drive shaft, provided with an opening, a centrifugal device secured to said drive shaft and having a portion arranged to extend through the said opening, a slidable member disposed within said shaft and arranged to be moved longitudinally with respect to the latter through the engagement of the inwardly extending portion of the centrifugal device, a number wheel having a cam groove, and means carried by said slidable member for engaging said cam groove to rotate the number wheel.

MARVIN SMITHEY.

Copies of this patent may be obtained for five cents each, by addressing the "Commissioner of Patents, Washington, D. C."